Figure 1:
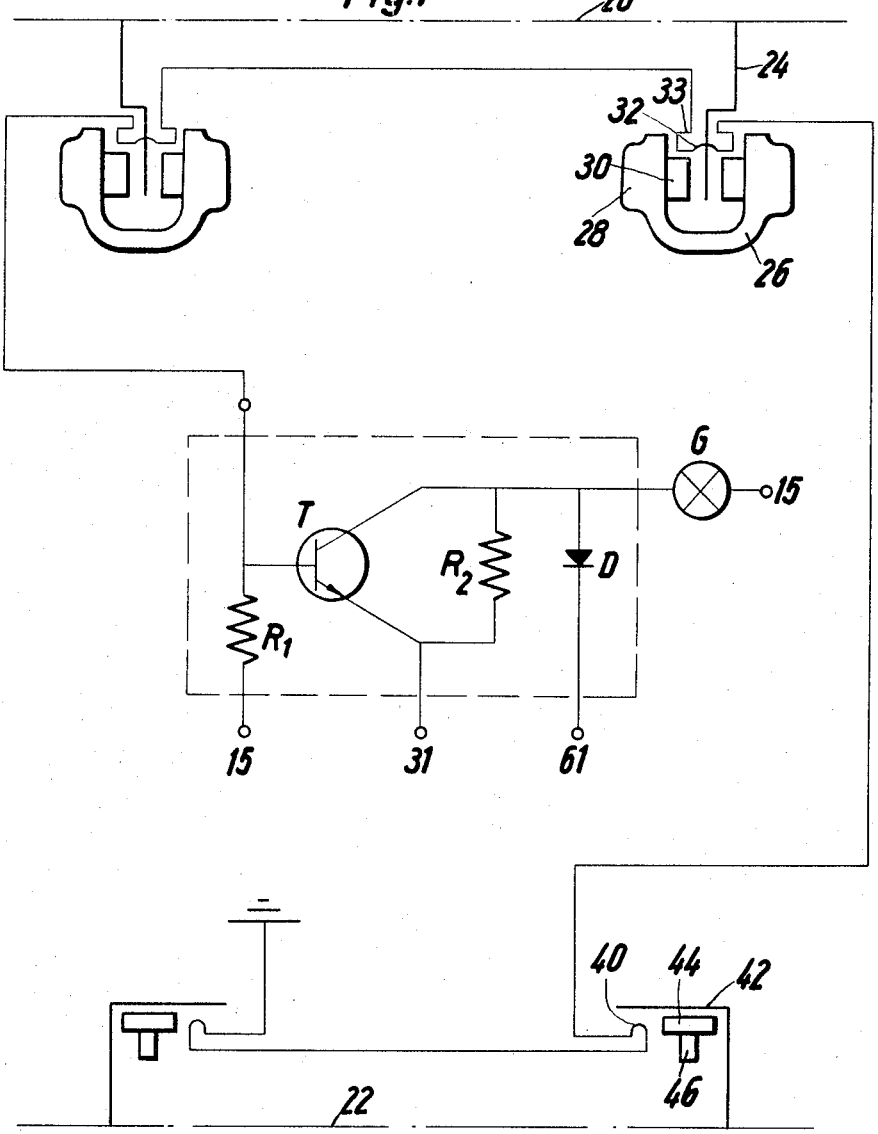

United States Patent [19]
Wilhelmi

[11] 3,755,774
[45] Aug. 28, 1973

[54] AXLE IDENTIFYING BRAKE WARNING SYSTEM

[75] Inventor: Heiner Wilhelmi, Hamburg, Germany

[73] Assignee: Jurid Werke GmbH, Glinde b. Hamburg, Germany

[22] Filed: Dec. 16, 1971

[21] Appl. No.: 208,786

[30] Foreign Application Priority Data
Dec. 22, 1970 Germany............... P 20 63 005.1

[52] U.S. Cl. ........................... 340/52 A, 200/61.44
[51] Int. Cl. ............................................. B60t 17/22
[58] Field of Search............... 340/52 A, 52 B, 52 F; 200/61.4, 61.42, 61.44

[56] References Cited
UNITED STATES PATENTS
3,456,236  7/1969  Labartino et al. ............... 340/52 A Primary Examiner—Alvin H. Waring
Attorney—D. C. Roylance, Walter C. Farley et al.

[57] ABSTRACT

A brake condition warning system including conductor portions mounted on linings of drum type brake shoes so that the conductors are opened when the brakes reach a predetermined wear level but can be temporarily bridged by the counter friction surface upon reapplication of the brakes. Other conductor portions are mounted on frangible supports adjacent disc brakes but, upon destruction thereof, are not bridgeable, even temporarily. The system includes two axles, each having a different kind of brake, and a signal light and switching means to turn the light on when at least one portion is opened. Reapplication of the brakes tells the driver which axle has the brake which has reached the predetermined state of wear.

4 Claims, 3 Drawing Figures

AXLE IDENTIFYING BRAKE WARNING SYSTEM

The invention relates to a warning arrangement to signal a state of the brakes in a vehicle having two axles that are to be braked.

In the construction of motor vehicles, braking force amplifiers are being used to an increasing measure and in connection with it, also antiskidding devices. These devices are to make certain the the braking process proceeds in a precisely defined optimum manner. Thus, the danger to vehicle and passengers, which develops often in the case of improper braking, will be avoided. The driver of a vehicle which is equipped with a braking force amplifier and antiskidding device must, however, get along without the so-called "feel" of the brake. Upon operation of the brake pedal, the driver will not feel whether or not the brakes actually operate reliably.

In order to eliminate this disadvantage, brakes are equipped with additional sensors which are connected with a signaling device lying within the area of perception of the driver and which give a signal to the driver whenever the brake linings of the vehicle have been worn down to a certain limit of wear that cannot be exceeded without endangering the vehicle.

The sensor arrangements in most cases contain elements that are disposed on the support for the brake lining and that are movable together with said support against the counter friction surface. A free end of such a sensor or one embedded in the brake lining extends precisely to the limit of wear, i.e., to the surface up to which the brake linings can be worn down only through wear caused by braking, if the brakes are to operate reliably. Upon reaching the wear limit, the end of the sensor comes into contact with the counter friction surface, (the surface against which the lining acts in the braking operation) as a result of which a circuit is closed, causing the signaling device to respond. One disadvantage of this arrangement lies in the fact that contact of the sensor with the counter friction surface can be prevented by dirt or by the fact that the brake drum mounted together with the wheel on the axle does not have ground contact because of the lubrication of the axles, thereby preventing the warning.

In an effort to overcome this problem, there have been sensors that have the shape of conductor loops, which have been disposed in such a way that with their approach to the wear limit, the conductor loop is interrupted by the braking abrasion processes. This interruption of a circuit is utilized for closing another circuit containing the signal transmitter, preferably an electric light bulb. Another possibility consists in arranging resistance elements in the brake in such a way that they are worn down continuously together with the brake lining, so that the resistance will decrease correspondingly in the circuit that contains these elements and a signaling light will continuously flash more brightly. This arrangement therefore not only is to signal the reaching of a limit but it also is to signal the pertinent condition of the brakes by its brightness. At the same time, however, and just as in the case of other known devices, only a summary signaling has been provided.

It has also been proposed to attach the conductor loops used as sensor elements on a support, of which at least a part consists of a brittle material that can be destroyed by pressure, and the support with this section of the conductor loop is shaped and disposed so that the destructible part, connected with the remaining support, will be destroyed upon reaching the wear limit. This takes place through the fact that the section of the sensor element that is to be destroyed is crushed between the parts of the brake that can be moved against each other. The destruction is arranged so that between the expected fracturing places no conductor connection will exist any longer and so that it cannot be reestablished during a subsequent braking process.

If a driver during travel determines, on the basis of an acoustic or flashing signal, that at least one brake has reached the wear limit, it is most often not possible to take care of this damage immediately. Also, the driver can usually count on the fact that only one brake has reached this wear limit. In the case of a vehicle where the braking process takes place on two axles and four wheels, there will consequently be three brakes that will still be operating reliably in the interval to reach a workshop. The safety of the driver will be improved in the case of such travel if the driver can determine, without much trouble, i.e., without being compelled to first stop for a check, on which axle the brake which is no longer reliable is disposed. In the case of the warning devices known heretofore it would be necessary, if this object were to be achieved, to provide a separate warning circuit for each axle. This expense heretofore was avoided. Also, an additional signal transmitter, generally speaking, a light bulb, would decrease the clearness of the arrangement on the dashboard.

The object of the present invention is to create a warning device that makes possible, without additional signal transmitters, an additional signal which manifests itself while the vehicle is still moving, from which the driver can gather at which axle the brake whose lining has been worn down to the wear limit is located. For this purpose, the invention starts with a warning device signaling the state of the brake in a vehicle having two axles that are to be braked, with a circuit arrangement connected during operation of the vehicle to a current supply, which arrangement contains a signal transmitter and switching means disposed in the brakes of the wheels and responds upon reaching a wear limit of the brake lining, which switching means have conductor loops that are to be interrupted by abrasion. The object of the invention is achieved for such a warning arrangement through the fact that the conductor loops in the brake for one axle each time have a section that can be destroyed when the wear limit is reached, the connecting terminals of which lie at a distance behind the wear limit, and in that conductor loops are provided in the brakes of the other axle whose ends, which adjoin the interruption section controlled by wear, lie in the plane of the wear limit and in the case of engagement of the brakes, can be connected by way of the counter friction surfaces.

Preferably, such a warning device is used in the case of a motor vehicle that is equipped with an axle that is to be braked by means of disc brakes or drum brakes, whereby according to the invention, the conductor loops with the destructible section are disposed on the disc brakes while the conductor loops with the interruption section that can be bridged in the case of wear, are disposed on the drum brakes.

According to the invention, a conductor loop serving as a sensor and connecting mmeans will be destroyed upon one brake of one axle reaching the wear limit to such an extent that no renewed bridging will occur even as a result of later processes. On the other hand, by reaching the wear limit at one brake of the other axle, a conductor loop will be interrupted where the ends adjoining the interruption lie in the wear limit which then constitutes the braking surface and is bridged again by means of the counter friction surface. Therefore, if after a braking process the signal transmitter responds, e.g., a bulb flashes, and signals the wearing down of a brake extending to the wear limit, this warning signal disappears in the case of a renewed braking action if the wear occurred on that axle on which the interruption of the conductor loop can again be bridged by the counter friction surface. On the other hand, the signal will remain if it has been caused by a conductor loop where a part of the conductor has been destroyed at both ends to behind the wear limit.

If the signal transmitter has responded and shown that a brake has been worn down to the wear limit, the driver subsequently merely has to delay his travel once more briefly by stepping once more on the foot brake. Depending upon the case of this new delay, on whether the signal disappears or remains, the driver will determine by this process on which axle the brake is that needs repair. Stopping the vehicle and a careful examination of the front and rear axle is therefore not required.

Further advantages and characteristics of the invention will result from the claims as well as from the succeeding description and the drawings, in which a preferred embodiment of the invention is explained and shown by way of example.

Figure 2:
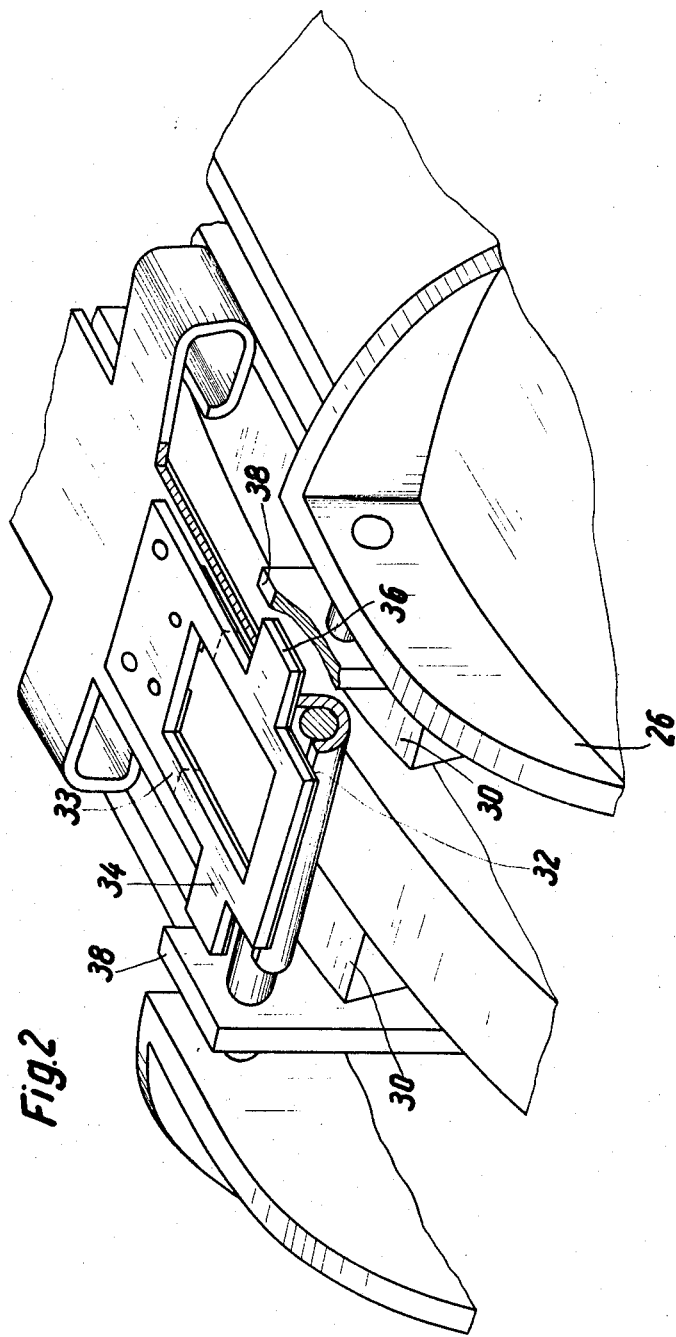
Figure 3:
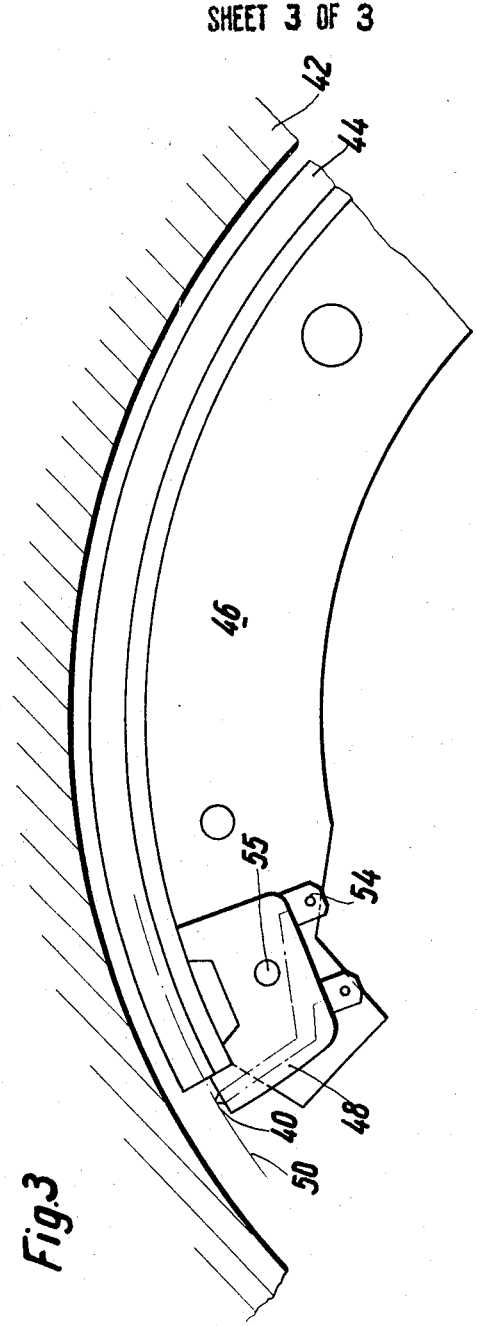

FIG. 1 is a schematic diagram of a brake signal circuit, in simplified form, in accordance with the invention;

FIG. 2 is a simplified perspective diagrammatic view of a part of a disc brake with partial lining with a fixed saddle open in the radial direction of the brake disc and with a destructible conductor loop according to the invention; and FIG. 3 is a simplified side elevation, in partial section of a drum brake with a conductor loop that is to be interrupted as a result of wear according to the invention.

A warning device, according to the invention, shown in a simplified manner in FIG. 1, is disposed in a motor vehicle that has a front axle 20 and a rear axle 22. Brake discs 24 are firmly and rotatably connected with the front axle 20. The brake saddle 26 containing the cylinders 28 for the operation of the brake linings 30 attached to the supports overlaps brake disc 24. Such brakes are well known and do not need to be explained in detail here and neither do the hydraulic arrangements.

According to the invention, a conductor loop 32 is disposed above brake disc 24. The conductor loop 32, see also FIG. 2, is developed in such a way that upon wear of the brake lining 30 to the wear limit, a section of the conductor loop is destroyed to such a point that the connecting ends adjoining the destroyed part can no longer be bridged again in the brake even by subsequent brake operations. For this purpose, conductor loop 32 is attached as a foil cover on a support 34, which is produced of a brittle material that can be destroyed by pressure. Support 34 is attached to a spring that forces apart brake linings 30 following a braking process and after release of cylinders 28. Brake linings 30 are attached to brake lining supports 38, between which the wings 36 of the loop support 34 extend. Wings 36 extend axially, with reference to brake disc 24, for a distance which does not permit the free ends of wings 36 to contact the brake lining supports 38 if the brake linings 30 are not worn down. Only after reaching the wear limit will wings 36 be compressed between the brake lining supports 38 as a result of which support 34 for the conductor loops is destroyed starting at the expected fracture places 33. The remaining part of support 34, still located on the spring, with the connecting ends adjoining the destroyed part at 33, has such a slight width that it always will remain out of engagement with the movable parts 38 of the brake.

The rear axle 22 is connected firmly and rotatably with the brake drum 42, in which brake linings 44 of brake shoes 46 are pressed against the counter friction surface of drum 42 upon operation of the brake. A conductor loop 40 has been disposed beside brake lining 44 in such a way that it is moved with brake shoes 46 against the counter friction surface.

FIG. 3 shows details of the arrangement. Conductor loop 40 is embedded in a support 48 which is attached with the aid of a clamping screw 55 or some similar well known means, in an adjustable manner on brake shoes 46, so that the free section of conductor loop 40 will project precisely to wear limit 50 of brake lining 44. Conductor loop 40 has been provided with terminals 54.

In the event lining 44 wears down to the wear limit 50, the section of conductor loop 40 lying in the plane of the wear limit likewise will be worn down to such a point that the conductor loop is interrupted at this place and merely projects into the plane of the wear limit with the conductor ends abutting against the worn down section. In the case of a braking action following the interruption, these two free ends again are bridged by the counter friction surface of drum 42, so that the interrupted circuit again is closed for the duration of the braking action.

As FIG. 1 shows, the conductor loops 32 of axle 20 and 40 of axle 22 used according to the invention are electrically connected in series circuit relationship and are provided, in addition, with connections 15, 31, 61 and a second connection 15. The designations 15, 31 and 61 are identical to designations customary in motor vehicle construction. Connections 15 lead to the positive pole of a battery via the ignition starter switch of a motor vehicle. Connection 31 is connected to the ground. Connection 61 is connected with the regulator of the generator so that, upon switching on the ignition starter, the connection is at first negative, i.e., it is connected to the ground. As soon as the generator produces normal charging voltage, connection 61 becomes positive. Before the second connection 15 is the signal transmitter in the form of a light bulb G.

The circuit is such that upon switching the ignition on, the light bulb G flashes on, since a current flows between 15 and 61 via bulb G and diode D. Transistor T is controlled by the circuit containing the loops 32 and 40 and the resistor $R_1$, in such a way that no current flows through the circuit between second connection 15, through signal transmitter G and connection 31. However, in the event of a failure (open circuit) in conductor loops 32 for example, this path is opened so that bulb G upon the ignition being switched on and prior to starting the engine will flash and will not go out even when charging voltage is being provided. In case conductor loops 32, 40 are intact, and in the case of a charging voltage from the generator, no current flows via the branch leading to signal transmitter G. Only when the part of the circuit containing the conductor loops 32, 40 is interrupted will transistor T be put in a state that allows a flow of current through signal transmitter G.

The arrangement according to the invention thus has a testing circuit that will permit determination, even before starting to drive, of whether or not the brakes and the conductor loops disposed in them are in order. During travel, bulb G will light up only when a dangerous state arises. Finally, through the fact that the conductor loops 32 at the front axle 20 and 40 at the rear axle behave differently, and that the part of the circit leading across the loops 40 can again be closed as a result of a braking action in the case of an opened loop, the driver is provided with information regarding which axle has a brake on which the lining has been worn down to the wear limit.

What is claimed is:

1. A system for providing an axle identifying warning signal indicating a predetermined wear state in a vehicle of the type having two axles which are to be braked, the system comprising the combination of
   first electrical conductors;
   means for mounting portions of said conductors in predetermined relation with the brake linings of the brakes of one axle,
   said means for mounting including frangible support means, which support means and the conductor portion mounted thereon are disposed to be destroyed when the predetermined wear limit is reached;
   second electrical conductors;
   means for mounting portions of said conductors in predetermined relation with the brake linings of the brakes of the second axle so that wear of the linings to said predetermined state interrupts a section of a portion and exposes the ends of the interrupted section, which ends can be temporarily electrically bridged together by engagement of the shoe with the counter friction surface;
   circuit means connecting said electrical conductors associated with both axles into a series circuit;
   a signal annunciator;
   a power source connectable to said circuit means; and
   switch means connected to said circuit means and said annunciator for activating said annunciator only when said power source is connected and at least one of said portions is removed.

2. A system according to claim 1 wherein the vehicle is provided with a first axle having disc brakes and a second axle having drum brakes, and wherein
   said conductor portions mounted on frangible support means are disposed on said first axle on said disc brakes, and
   said conductor portions interruptable by wear and which can be temporarily bridged by the counter friction surface are mounted on said second axle on said drum brakes.

3. A system according to claim 2 wherein said means for mounting includes means for adjusting the predetermined relation of said conductor portions on said second axle relative to the brake shoe.

4. A system for providing an axle identifying warning signal for indicating a predetermined wear state in a vehicle having two axles which are to be braked, each axle having a different kind of brake, the system comprising:
   first electrical conductors;
   means for mounting portions of said conductors in predetermined relation with the linings of the brakes of one axle, said portions being mounted so that the wear of the brake linings to the predetermined state permits said portions of the conductors to be destroyed;
   second electrical conductors;
   means for mounting portions of said conductors in predetermined relation with the linings of the brakes of the other axle, said portions being mounted so that the wear of the brake linings to the predetermined state permits said portions of the conductors to be interrupted, and so that said interrupted section of said portions of the conductors can be temporarily bridged by engagement of the brake shoe with the counter friction surface;
   circuit means for interconnecting said electrical conductors of both axles;
   means for cooperating with said circuit means to provide a first indication when the brakes on one axle have reached the predetermined state of wear, and for providing a second indication when the brakes on the other axle have reached the predetermined state of wear.

* * * * *